United States Patent [19]

Gorisch et al.

[11] Patent Number: 4,744,091
[45] Date of Patent: May 10, 1988

[54] MIRROR ASSEMBLY FOR GAS LASER

[75] Inventors: Wolfram Gorisch, Aschaffenburg; Rainer Nitsche, Offenbach; Walter Skrlac; Dieter Wendt, both of Bruchköbel; Walter Wohlfart, Kleinostheim; Volker Ernst, Olching; Walter Kirchner, Türkenfeld; Volker Weyer, Emmering, all of Fed. Rep. of Germany

[73] Assignee: W. C. Heraeus GmbH, Hanau, Fed. Rep. of Germany

[21] Appl. No.: 921,965

[22] Filed: Oct. 21, 1986

[30] Foreign Application Priority Data

Nov. 26, 1985 [DE] Fed. Rep. of Germany ....... 3541744

[51] Int. Cl.$^4$ .............................................. H01S 3/08
[52] U.S. Cl. ..................................... 372/107; 372/72; 372/95
[58] Field of Search ............... 372/99, 107, 70, 72, 372/92, 95

[56] References Cited

U.S. PATENT DOCUMENTS 3,891,945  6/1975  Schlossberg et al. ................ 372/35

FOREIGN PATENT DOCUMENTS 1589624  5/1970  Fed. Rep. of Germany .
3009611  9/1981  Fed. Rep. of Germany .

Primary Examiner—James W. Davie
Assistant Examiner—B. Randolph
Attorney, Agent, or Firm—Felfe & Lynch

[57] ABSTRACT

A gas laser has (1) a reflecting body with a reflecting surface, (2) excitation space structure cooperative with the reflecting body for defining an excitation space which is open opposite the reflecting surface of the reflecting body, (3) devices for lasingly exciting a gas in the excitation space and (4) a mirror assembly. The mirror assembly has a mirror having a reflecting surface facing the opening in the excitation space. A radial flange is about the mirror with the reflecting surface of the mirror on one axial side of the radial flange. At least one spacer and, preferably three, circumferentially-spaced bars project from the excitation space structure and engage the radial flange substantially axially for supporting it at least one of axially slidably and tiltably. Bellows sealingly connect the one axial side of the radial flange to the opening of the excitation space structure and its other axial side to a backplate immovably connected to the spacer bar on the other axial side of the radial flange. Preferably, the reflecting body is another such mirror assembly.

20 Claims, 2 Drawing Sheets

MIRROR ASSEMBLY FOR GAS LASER

BACKGROUND OF THE INVENTION

The invention relates to a mirror assembly for a gas laser and, more particularly, a radially-excited gas laser.

A known, radially-excited gas laser has a cylindric, lasing-gas-containing, excitation-space structure (e.g., laser tube) axially bounded by two mirrors for lasing resonation. Each mirror is connected to a radially-extending flange, and a metal bellows sealingly connects each flange to the excitation-space structure. The flanges are also connected to each other by holding or spacer bars.

Such a laser is disclosed in German patent publication No. 30 09 611, for example. In making this laser, the resonator mirror, axial-end flange, bellows sealingly and laser tube components are first connected together and then the mirrors are "centered." More particularly, the bellows seals are intended to make it possible to extend the lasing-resonation distance between the mirrors, i.e. the laser body, longitudinally, e.g. axially, without hindrance.

It can be seen from the drawing of the patent publication, however, that the described components, and especially the lasing-end mirrors, are braced on sliding rings to form seals. It is a disadvantage of such a mirror-bracing arrangement that the sliding rings exert pressure on the mirrors, because pressure- and, thus, distortion-free mirror mounting is, then, not assured.

SUMMARY OF THE INVENTION

It is, therefore, an object of the invention to provide a mirror assembly for a gas laser in which the mirrors are adjustably held without distortion, i.e., without pressure.

It is another object of the invention to offer the possibility of keeping the mirrors free from pressure and/or thermal distortion even during the operation of the laser.

To these and other ends, a gas laser of the above-described type, having a reflecting body with a reflecting surface, excitation space structure cooperative with the reflecting body for defining an excitation space which is open opposite the reflecting surface of the reflecting body, and devices for lasingly exciting a gas in the excitation space, has an improved mirror assembly. The mirror assembly has a mirror having a reflecting surface facing the opening in the excitation space. A radial flange is about the mirror with the reflecting surface of the mirror on one axial side of the radial flange and, preferably, projecting axially therefrom. At least one spacer bar and, preferably, three, circumferentially-spaced, spacer bars project from the excitation space structure and engage the radial flange substantially axially for axially slidably and/or tiltably supporting it. Bellows sealingly connect the one axial side of the radial flange to the opening of the excitation space structure and its other axial side to a backplate immovably connected to the spacer bar on the other axial side of the radial flange. Preferably, the reflecting body is another such mirror assembly.

Owing to the fact that each mirror forms a structural unit with the respective radial flange, bellows and backplate, i.e., is spacedly sealed gas tight on the side facing away from the excitation space by the bellows preferably welded onto the backplate which, therefore, closes off the laser interior from the outside atmosphere, the gas pressure of the excitation space can act on both sides of each mirror assembly reflecting body. This avoids gas-pressure distortion of the mirrors. The bellows space between the mirrors and backplates avoids backplate-pressure distortion, too.

Through this arrangement, too, because the resonator mirrors are each mounted between two bellows, the radial flanges can be supported slidably and/or tiltably on the spacer bar for correspondingly positioning the mirrors therein. Moreover, this construction offers the advantage that the mirrors and radial flanges can be prefabricated as mirror-assembly structural units, and then bellows-welded to the laser without heat distortion of the mirrors. The mirror/radial flange structural unit may even be manufactured from one block of material, but to provide a cooling channel therebetween, preferably consist of two components which are connected to each other by soldering or welding, preferably before forming the reflecting surface of the mirror and installing the mirror/radial flange structural unit in the laser.

The laser construction described has proven its value, particularly, for lasers with resonating, light-folding, multi-pass mirrors because, particularly with such lasers, slight deformations in the mirrors can lead to operational maladjustments.

The following procedure has proved advantageous for assembling the laser. First, a radial flange is soldered or welded about a block of material which will form the reflecting body when a reflecting surface is applied thereto. Alternatively, the radial flange and reflecting body can be formed form one block of material. The radial flange/reflecting body unit is then tempered.

The tempering time and temperature are selected for relieving internal mechanical stresses in the body unit effectively enough that it can be machined for forming the reflecting surface on the reflecting body, for example. Such stresses can arise, especially, in a unit which consists of two parts welded together. For a copper block of material, however, for example, the tempering time is between 1 and 5 hours at a temperature of from about 250° to about 400° C. Subsequently, or after further intermediate steps which do not induce mechanical stresses, the reflecting surface is worked onto the reflecting body to form a mirror for the laser light to be produced in the laser. This step of the process is, preferably, carried out by machining with diamond tools.

Now or, preferably, before machining the reflecting surface onto the reflecting body, one end of each of the bellows is sealingly soldered or, preferably, welded with a laser to the radial flange about the reflecting body. The bellows is a thinner, softer element, sufficiently that its welding to the radial flange or, subsequently, the backplate is not a thermally-critical step. To assure good accessibility for machining the reflecting surface onto the reflecting body, it has proved advantageous to have the reflecting body axially protrude beyond the one, preferably radially-planar axial end of the radial flange facing the excitation space, and beyond any welding projection thereon to aid in welding on the bellows, and beyond this bellows.

The mirror/radial flange structural unit is then installed in the laser by sealing the other end of each bellows to the excitation space structure and backplate, respectively, preferably by welding. The bellows then on either side of the radial flange then makes it easily possible to tilt the mirror therein in order to adjust the laser.

With this structural design of the laser and its mirror assembly, it is possible to keep the mirrors free of distortion even during operation of the laser. For avoiding thermal distortion, the radial flange has at least one cooling duct thermally close to the reflecting surface Of the mirror. This cooling duct can be milled without difficult, for example, as a groove in a radial flange which is separate from the mirror before the radial flange is welded or soldered, for example, to the mirror over the groove. The resulting cooling duct is then bounded by a, for example, axial, surface of the mirror. During the operation of the laser, a gas or liquid coolant flows through the cooling duct sufficiently to maintain the mirror at a preferably-constant temperature low enough that temperature-induced deformation of the mirror reflecting surface is prevented. Temperature gradients from operation of the laser which could deform and, thus, misalign the mirror or reflecting surface are, therefore, suppressed. The avoidance, too, of gas-pressure and/or backplate-pressure distortion during operation has already been described.

To adjust the mirror and, especially, readjust it, the radial flange may be supported on the spacer bar for tilting and/or axial movement by screwing elements such as nuts, for example, threadingly attached to the spacer bar. For this, at least the one of the preferably-three spacer bars which each consist of a material of thermally-invarying length, and preferably all three, has a fine-pitched, external thread on which two adjusting nuts are mounted on axially opposite sides of the radial flange thereat.

BRIEF DESCRIPTION OF THE DRAWINGS

Further details and characteristic features of the invention emerge from the following description of merely preferred and illustrative embodiments in light of the drawing thereof, in which.

DESCRIPTION OF THE PREFERRED EMBODIMENTS

Figure 1:
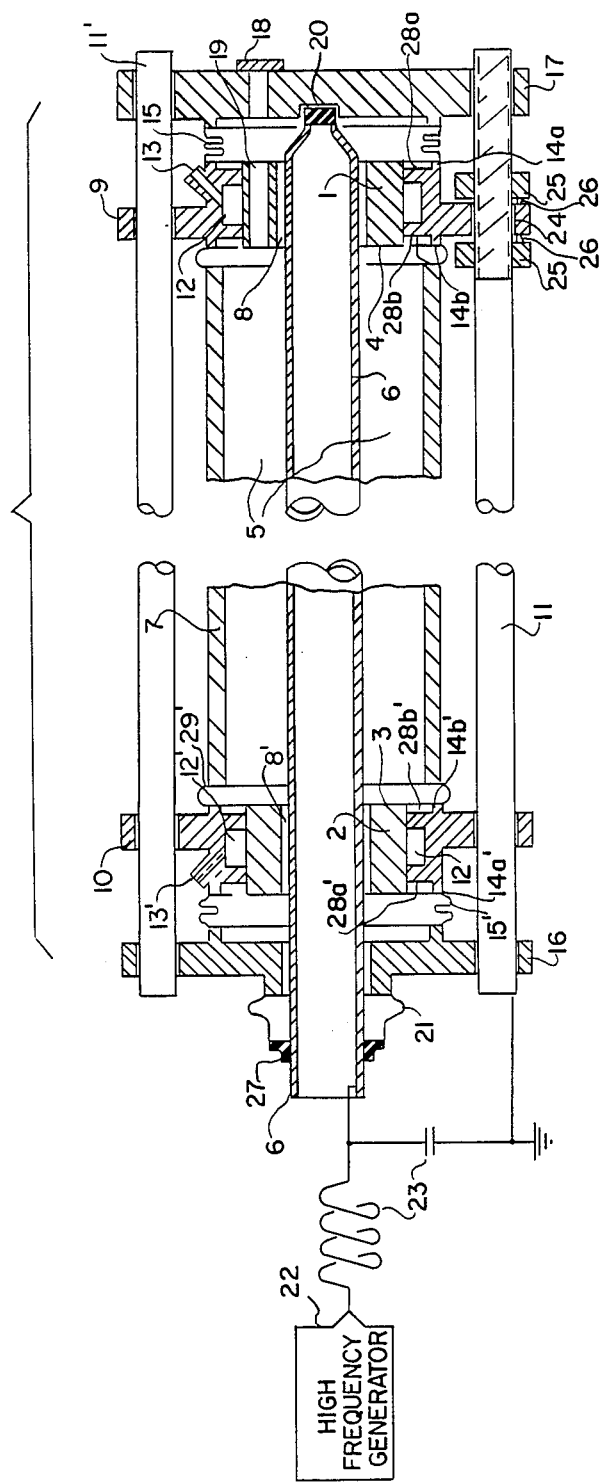
FIG. 1 is an axial elevation, partly in section and partly broken away, of mirror assemblies for a gas laser together with the gas laser.

The gas laser shown in FIG. 1 has two, facing, resonator, light-folding, mirrors or reflecting bodies 1, 2, the reflecting surfaces 4, 3, respectively, of which axially delimit a lasing-excitation space 5. Radially, the lasing-excitation space is annularly bounded by radially-spaced, tubular, inner and outer electrodes 6, 7.

Each reflecting body 1, 2 is a thick-walled, cylindric tube spacedly receiving the inner electrode 6 in its central, axial opening with an annular space 8, 8' therebetween. The spaces 8, 8' between the inner electrode 6 and reflecting bodies 1, 2 accommodate differing thermal expansion, avoid thermal stress and provide electrical insulation between the inner electrode and the reflecting bodies. They also allow gas in the excitation space for lasing excitation to pass to the other side of the reflecting bodies 1, 2, the space about which is sealed, as later described. The pressure of the gas on the reflecting bodies 1, 2 is, thus, the same on both axial sides of each reflecting body 1, 2 to avoid gas-pressure distortion of their reflecting surfaces 4, 3, respectively.

A radial flange 9, 10 is welded or soldered to the outside of the reflecting bodies 1, 2, respectively, to form a unit therewith. Each radial flange 9, 10 slidably and/or tiltably receives an outermost, supporting structure for the laser, including the mirror/radial flange units, in the form of circumferentially-spaced, generally-axial holding or spacer bars 11, 11'. The bars are made of a material having a low coefficient of thermal expansion such as a material sold under the trade name Cerodur, a metal sold under the trade name of Invar or quartz, for example.

Each radial flange 9, 10 has an inwardly-open annular groove 12, 12' which is, therefore, bounded on its inside by the outer surface of the mirror or reflecting body 1, 2, respectively, to form a duct. A coolant, such as water, for example, is supplied to and discharged from the reflecting-body-bounded annular groove of each radial flange 9, 10 through connecting pieces 13, 13', respectively (only one each shown), for cooling the reflecting bodies during the operation of the laser. This prevents thermal deformation of the reflecting bodies and, thus, their reflecting surfaces. If such cooling measures are not required, however, the reflecting bodies 1, 2 and the respectively-associated radial flanges 9, 10 may be constructed from one block of material.

Each radial flange 9, 10 also has an annular, axial projection $14a$, $14b$; $14a'$, $14b'$ on each, axial end $28a$, $28b$; $28a'$, $28b'$, respectively, which is radially planar between the projection and the innermore mirror 1, 2, respectively. One end of a mechanically-soft, intermediate-element, tubular bellows 15, 15' is sealingly welded by laser welding, for example, to each projection $14a$, $14a'$. One end of a similar tubular bellows 29, 29' is sealingly welded to each projection $14b$, $14b'$. The other ends of the bellows 29, 29' are sealingly welded to opposite ends of the outer electrode 7 and the other ends of the bellows 15, 15' are sealingly welded to backplates or end pieces 17, 16, respectively. The bellows 15, 15' and backplate 17, 16 thus define the sealed space on the opposite sides of the reflecting bodies 1, 2 for the distortion-preventing pressure of the gas which passes through the annular spaces 8, 8' between the reflecting bodies 1, 2 and the inner electrode 6 and the distortion-preventing spacing of the reflecting bodies 1, 2 and backplates 17, 16, respectively.

The backplates 16, 17 are immovably connected to the holding rods 11, 11'. Backplate 17 has a window 18 from which the laser beam emerges after folding or resonating through the annular excitation space 5 between the reflecting surfaces 3, 4 functioning as folding mirrors. For this, an outlet opening 19, in the form of a hole drilled through the reflecting body 1, is aligned with the window 18.

One end of the inner electrode 6 is supported on the backplate 17 by an insulating pin 20 which engages a corresponding recess in the backplate 17. The other end of the inner electrode spacedly passes through an opening in the other backplate 16 to the outside. A further tubular bellows 21 sealingly supports the inner electrode from the backplate 16 with an insulating end ring 27 on the inner electrode.

The electrical supply system for the laser has a high-frequency generator 22. Impedance-matching elements 23 connect the generator to the inner and outer electrodes as shown schematically in FIG. 1. The resulting high-frequency field between the electrodes lasingly excites gas in the excitation space 5 for laser operation.

To relatively adjust the reflecting surfaces 3, 4 of the reflecting bodies 1, 2, nuts 25 are screwed onto fine-pitched threads 24 of the holding rod 11 to engage axially-opposite sides of the radial flange 9 thereat. The radial flange 9 with its reflecting body 1 can thus be tilted and/or moved axially relative to radial flange 10 with its reflecting body 2 by screwing the nuts 25 along threads 24 of the holding rod 11. Preferably, each nut 25 has an axial lug 26 to provide a point support for so positioning the radial flange 9. If the radial flange 9 is similarly fixed by nuts (not shown) like nuts 25 to another holding rod (not shown) like holding rod 11, but not diametric therewith, it is possible to tilt and/or axially move the radial flanges and thus their reflecting surfaces in all directions relative to each other. The nuts 25 and like nuts are, moreover, readily accessible, so that the laser can be readjusted without difficulty even after it has been started up.

Figure 2:
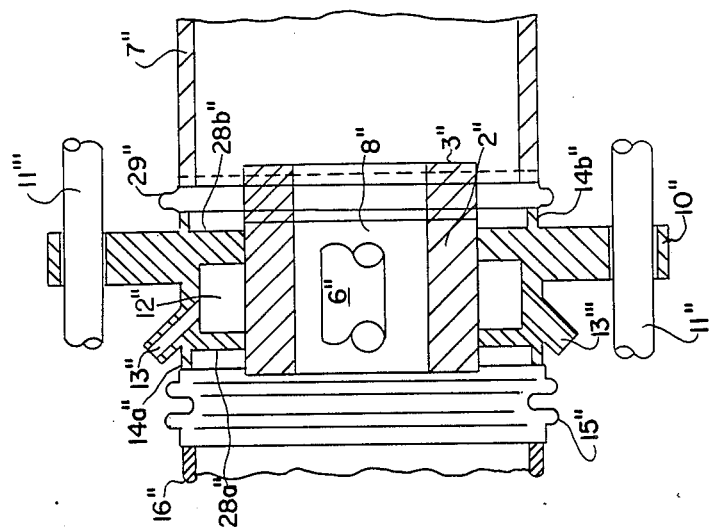
FIG. 2 is an axial elevation of another mirror assembly for another gas laser together with portions of the other gas laser.

FIG. 2 shows an embodiment of a mirror/radial flange unit 2"/10" similar to that of FIG. 1 in most respects. The components shown are, therefore, identified in correspondence with FIG. 1.

One difference of the embodiment of FIG. 2 from that of FIG. 1 is, however, the two connecting pieces 13", 13''' for letting cooling water into and out of the mirror-bounded cooling duct 12" about the radial flange 10'. This facilitates water flow and, thus, cooling.

Another difference is the axial projection of the mirror or reflecting body 2" from the radially-planar axial end portion 28b" of the radial flange 10" about the mirror radially to projection 14b" for welding on the bellows 29" to the reflecting surface 3" of the mirror. In the embodiment of FIG. 2, like that of FIG. 1, the mirror 2" axially projects (rightward, as shown) beyond the radially-planar axial end 28b" of the radial flange to its reflecting surface 3". In the embodiment of FIG. 2, unlike that of FIG. 1, however, the mirror 2" also so axially projects beyond the bellows-welding projection 14b" and the bellows 29" to its reflecting surface 3". This facilitates forming the reflecting surface 3" after the mirror 2", radial flange 10" and bellows 29" are so assembled as a unit.

It will be understood that the specification and examples are illustrative but not limitative of the present invention and that other embodiments within the spirit and scope of the invention will suggest themselves to those skilled in the art.

We claim:

1. In a gas laser having a reflecting body with a reflecting surface, excitation space means for defining an excitation space opposite said reflecting surface of said reflecting body, and exciting means for exciting said gas in said excitation space, an improved mirror assembly comprising:
    a mirror having a reflecting surface facing the opening in said excitation space;
    a radial flange about the mirror and having two axial sides with the reflecting surface of the mirror on one axial side of the radial flange;
    at least one spacer bar means projecting from said excitation space means and engaging said radial flange for supporting said flange at least one of axially slidably and tiltably; a first bellows sealingly connecting the one axial side of said radial flange to said opening of said excitation space means;
    a backplate immovably connected to said spacer bar on the other axial side of said radial flange; and
    a second bellows sealingly connecting said other axial side of said radial flange to said backplate.

2. The mirror assembly of claim 1, wherein at least the one axial side of the radial flange about said mirror is radially planar and said mirror axially projects beyond the radially-planar axial side of the radial flange to its reflecting surface.

3. The mirror assembly of claim 2, wherein said radial flange has an axial projection about the radially-planar portion of said one axial side for the sealing connection of said first bellows sealingly connecting the radial flange to the opening of the excitation space means a and the mirror axially projects beyond the axial projection to its reflecting surface.

4. The mirror assembly of claim 2, wherein said mirror axially projects beyond said first bellows sealingly connecting said radial flange to the opening of said excitation space means.

5. The mirror assembly of claim 3, wherein said mirror axially projects beyond said bellows sealingly connecting said radial flange to the opening of said excitation space means.

6. The mirror assembly of claim 1, and further comprising a cooling duct thermally close enough to said mirror to be effective for cooling said mirror.

7. The mirror assembly of claim 2, and further comprising a cooling duct thermally close enough to said mirror to be effective for cooling said mirror.

8. The mirror assembly of claim 3, and further comprising a cooling duct thermally close enough to said mirror to be effective for cooling said mirror.

9. The mirror assembly of claim 4, and further comprising a cooling duct thermally close enough to said mirror to be effective for cooling said mirror.

10. The mirror assembly of claim 5, and further comprising a cooling duct thermally close enough to said mirror to be effective for cooling said mirror.

11. The mirror assembly of claim 1, wherein said spacer bar means further comprises a screwable element thereon on each axial side of the radial flange for the at least one of axially slidable and tiltable support of said radial flange.

12. The mirror assembly of claim 2, wherein said spacer bar means further comprises a screwable element thereon on each axial side of the radial flange for the at least one of axially slidable and tiltable support of said radial flange.

13. The mirror assembly of claim 3, wherein said spacer bar means further comprises a screwable element thereon on each axial side of the radial flange for the at least one of axially slidable and tiltable support of said radial flange.

14. The mirror assembly of claim 4, wherein said spacer bar means further comprises a screwable element thereon on each axial side of the radial flange for the at least one of axially slidable and tiltable support of said radial flange.

15. The mirror assembly of claim 6, wherein said spacer bar means further comprises a screwable element thereon on each axial side of the radial flange for the at least one of axially slidable and tiltable support of said radial flange.

16. The mirror assembly of claim 10, wherein said spacer bar means further comprises a screwable element thereon on each axial side of the radial flange for the at least one of axially slidable and tiltable support of said radial flange.

17. The mirror assembly of claim 1, and further cbmprising a projection on each axial side of the radial flange for the sealing connection of each bellows respectively thereto.

18. The mirror assembly of claim 9, and further comprising a projection on each axial side of the radial flange for the sealing connection of each bellows respectively thereto.

19. The mirror assembly of claim 14, and further comprising a projection on each axial side of the radial flange for the sealing connection of each bellows respectively thereto.

20. The mirror assembly of claim 15, and further comprising a projection on each axial side of the radial flange for the sealing connection of each bellows respectively thereto.

* * * * *